United States Patent
Zhou et al.

(10) Patent No.: US 10,742,903 B2
(45) Date of Patent: Aug. 11, 2020

(54) APPARATUS FOR IMAGING AND TERMINAL DEVICE

(71) Applicant: Guangdong Oppo Mobile Telecommunications Corp., Ltd., Dongguan, Guangdong (CN)

(72) Inventors: Yibao Zhou, Guangdong (CN); Haitao Zhou, Guangdong (CN); Xueyong Zhang, Guangdong (CN); Cheng Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 227 days.

(21) Appl. No.: 16/025,561

(22) Filed: Jul. 2, 2018

(65) Prior Publication Data
US 2019/0020830 A1    Jan. 17, 2019

(30) Foreign Application Priority Data
Jul. 14, 2017    (CN) .......................... 2017 1 0576385

(51) Int. Cl.
*H04N 5/33*    (2006.01)
*G06K 9/00*    (2006.01)
(Continued)

(52) U.S. Cl.
CPC ............... *H04N 5/33* (2013.01); *G06F 21/32* (2013.01); *G06K 9/00604* (2013.01); *G06K 9/209* (2013.01); *G06K 9/2036* (2013.01); *H04N 5/2251* (2013.01); *H04N 5/2256* (2013.01); *H04N 5/247* (2013.01); *H04B 1/38* (2013.01)

(58) Field of Classification Search
CPC ...... H04N 5/33; H04N 5/2256; H04N 5/2251; H04N 5/247; H04B 1/38; G06K 9/00604; G06K 9/2036; G06K 9/209; G06F 21/32
See application file for complete search history.

(56) References Cited

U.S. PATENT DOCUMENTS

2013/0048837 A1    2/2013    Pope et al.
2015/0304535 A1    10/2015    Smits et al.
(Continued)

FOREIGN PATENT DOCUMENTS

CN    201838010 U    5/2011
CN    204948203 U    1/2016
(Continued)

OTHER PUBLICATIONS

Extended European search report issued in corresponding European application No. 18180295.0 dated Oct. 11, 2018.
(Continued)

*Primary Examiner* — Oschta I Montoya

(57) ABSTRACT

An apparatus for imaging and a terminal device include a front camera configured to capture a visible light iris image, an iris recognition camera configured to capture an infrared iris image, and an infrared fill-light configured to emit infrared light when the iris recognition camera capturing the infrared iris image. The front camera and the iris recognition camera are packaged into an integrated unit. The integrated unit is coupled with a circuit board. The infrared fill-light is disposed at one side of the circuit board and adjacent to the integrated unit.

17 Claims, 7 Drawing Sheets

(51) Int. Cl.
*H04N 5/225* (2006.01)
*G06K 9/20* (2006.01)
*G06F 21/32* (2013.01)
*H04N 5/247* (2006.01)
*H04B 1/38* (2015.01)

(56) References Cited

U.S. PATENT DOCUMENTS

| | | | |
|---|---|---|---|
| 2017/0061210 A1* | 3/2017 | Ollila | H04N 5/23219 |
| 2017/0195467 A1 | 7/2017 | Chang et al. | |
| 2018/0012007 A1 | 1/2018 | Kim et al. | |
| 2020/0046235 A1* | 2/2020 | Jung | G06F 3/041 |

FOREIGN PATENT DOCUMENTS

| | | |
|---|---|---|
| CN | 204965457 U | 1/2016 |
| CN | 205068173 U | 3/2016 |
| CN | 205195819 U | 4/2016 |
| CN | 205545578 U | 8/2016 |
| CN | 206004784 U | 3/2017 |
| CN | 206251257 U | 6/2017 |
| CN | 106934269 A | 7/2017 |
| KR | 20160091114 A | 8/2016 |

OTHER PUBLICATIONS

International search report issued in corresponding international application No. PCT/CN2018/094966 dated Sep. 25, 2018.
Examination report issued in corresponding European application No. 18180295.0 dated Jan. 7, 2020.

* cited by examiner

APPARATUS FOR IMAGING AND TERMINAL DEVICE

CROSS-REFERENCE TO RELATED APPLICATION(S)

This application claims priority to Chinese Patent Application No. 201710576385.X, filed on Jul. 14, 2017, the content of which is hereby incorporated by reference in its entirety.

TECHNICAL FIELD

The present disclosure relates to the technology field of terminal devices, and more particularly, to an apparatus for imaging and a terminal device.

BACKGROUND

In the related art, more and more terminal devices such as mobile phones, tablet computers, etc., are configured with an iris recognition function. Iris recognition can not only be used to unlock and wake up the terminal device, but also can be applied to mobile payment, account login, and the like. Due to features such as convenience and high-security, iris recognition has been widely used.

With the evolution of technology, iris recognition is increasingly favored by major terminal equipment manufacturers. For iris recognition, it is necessary to set an iris recognition camera separately in the terminal device, which results in a lower compactness of the arrangement structure in the terminal device and will limit the space usage rate.

SUMMARY

Implementations of the present disclosure provide an apparatus for imaging and a terminal device, to improve the compactness of the apparatus for imaging and the space usage rate of a mobile terminal.

In a first aspect, there is provided an apparatus for imaging. The apparatus for imaging includes a front camera, an iris recognition camera, and an infrared fill-light. The front camera is configured to capture a visible light iris image. The iris recognition camera is configured to capture an infrared iris image. The infrared fill-light is configured to emit infrared light iris detection. The front camera and the iris recognition camera are packaged into an integrated unit. The integrated unit is coupled with a circuit board. The infrared fill-light is disposed on one side of the circuit board and adjacent to the integrated unit.

In a second aspect, there is provided a terminal device, which includes a circuit board and an iris recognition module. The iris recognition module includes: a front camera configured to capture a visible light iris image during iris detection, an iris recognition camera configured to capture an infrared iris image during the iris detection, and an infrared fill-light configured to emit infrared light during the iris detection. The front camera and the iris recognition camera are packaged into an integrated unit coupled with the circuit board. The infrared fill-light is disposed at one side of the circuit board adjacent to the integrated unit.

In a third aspect, there is provided a terminal device, which includes a housing defining an opening therein, a circuit board, and an integrated unit coupled with the circuit board. The integrated unit includes a front camera configured to capture a visible light iris image and an iris recognition camera configured to capture an infrared iris image. The terminal device further includes: an infrared fill-light disposed at one side of the circuit board adjacent to the integrated unit, and a plate adapted to the opening. The plate includes a first light transmitting portion, a second light transmitting portion, and a third light transmitting portion, the first light transmitting portion corresponds to the front camera, the second light transmitting portion corresponds to the iris recognition camera, and the third light transmitting portion corresponds to the infrared fill-light.

BRIEF DESCRIPTION OF THE DRAWINGS

To better illustrate the technical solutions of implementations of the present disclosure, the following descriptions will briefly illustrate the accompanying drawings described in the implementations. Obviously, the following described accompanying drawings are merely some implementations of the present disclosure. Those skilled in the art can obtain other accompanying drawings according to the described accompanying drawings without creative efforts.

DETAILED DESCRIPTION

Figure 1:
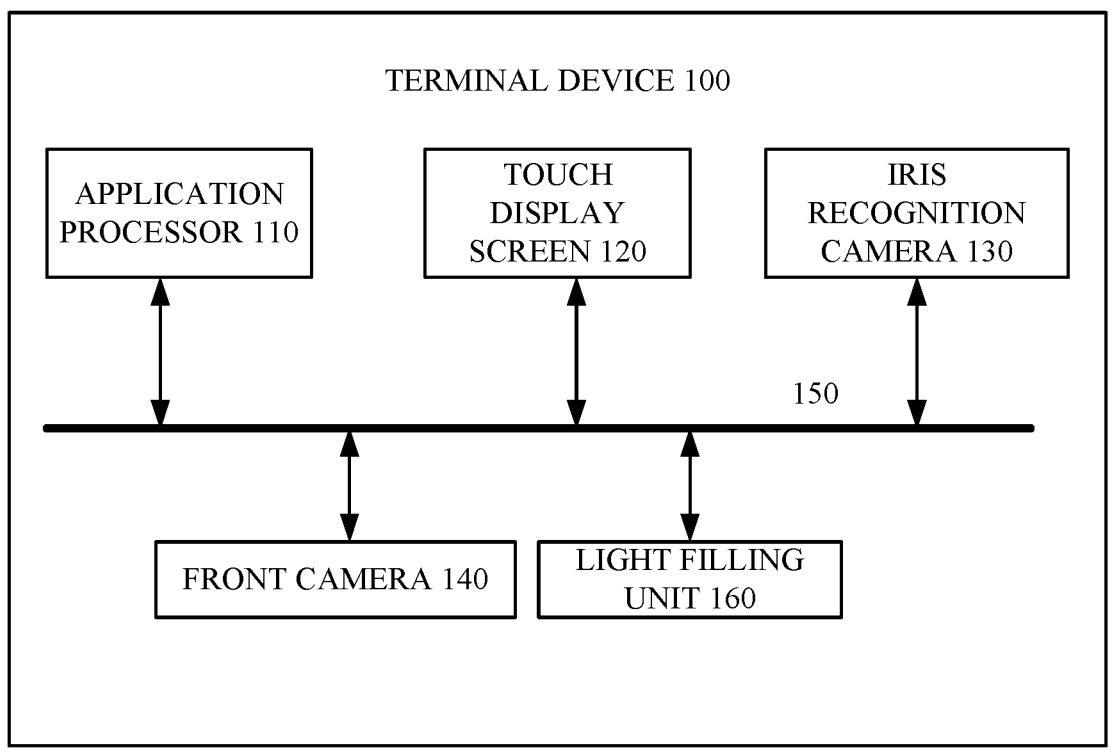
FIG. 1 is a schematic structure view of a terminal device according to an implementation of the present disclosure.

Technical solutions of implementations of the present disclosure will be described clearly and completely in combination with the accompanying drawings of the implementations of the present disclosure. Obviously, the described implementations are merely a part rather than all of implementations of the present disclosure. All other implementations obtained by those skilled in the art without creative efforts based on the implementations of the present disclosure shall fall within the protection scope of the present disclosure.

Terms "first", "second", and so on used in the specification, claims, and accompanying drawings of the present disclosure are used to distinguish different objects, rather than describe specific sequences. Additionally, terms "comprising", "having", and any deformation thereof are intended to cover a non-exclusive inclusion. For example, processes, methods, systems, products, or devices including a series of steps or units are not limited to listed steps or units, but in at least one alternative implementation, may include steps or units which are not listed, or in at least one alternative implementation, may further include other inherent steps or units for these processes, methods, products, or devices.

"Embodiment" mentioned herein means that particular features, structures, or characteristic described with reference thereto may be included in at least one implementation of the present disclosure. Appearances of such phrases in various places of the specification do not necessarily refer to the same implementation, nor refer to separate or alternative implementations that are mutually exclusive with other implementations. It is explicitly and implicitly understood by those skilled in the art that the implementations described herein may be combined with other implementations.

"Mobile terminal" or "terminal device" referred to in the implementations of the present disclosure may include smart phones (such as Android® mobile phones, IOS® mobile phones, Windows® mobile phones), tablet computers, handheld computers, notebook computers, mobile internet devices (MIDs), wearable devices, and so on. The above mentioned terminal device is merely an example and not an exhaustive one. The present disclosure includes but not limited to the above mentioned terminal device.

According to implementations of the present disclosure, there is provides an apparatus for imaging. The apparatus includes front camera, an iris recognition camera, and an infrared fill-light. The front camera is configured to capture a visible light iris image. The iris recognition camera is configured to capture an infrared iris image. The infrared fill-light is configured to emit infrared light when the iris recognition camera capturing the infrared iris image. The front camera and the iris recognition camera are packaged into an integrated unit. The integrated unit is coupled with a circuit board. The infrared fill-light is disposed at one side of the circuit board adjacent to the integrated unit. In other words, the infrared fill-light is disposed at one side of the circuit board and adjacent to the integrated unit.

According to the implementations of the disclosure, there is provided a terminal device. The terminal device includes a circuit board and an iris recognition module. The iris recognition module includes: a front camera configured to capture a visible light iris image during iris detection, an iris recognition camera configured to capture an infrared iris image during the iris detection, and an infrared fill-light configured to emit infrared light during the iris detection. The front camera and the iris recognition camera are packaged into an integrated unit coupled with the circuit board. The infrared fill-light is disposed at one side of the circuit board adjacent to the integrated unit.

The terminal device further includes a plate. The plate is adapted to an opening defined in a housing of the terminal device; the plate includes a first light transmitting portion, a second light transmitting portion, and a third light transmitting portion. The first light transmitting portion is disposed opposite to the front camera, the second light transmitting portion is disposed opposite to the iris recognition camera, and the third light transmitting portion is disposed opposite to the infrared fill-light.

According to implementations of the disclosure, there is provided a terminal device. The terminal device includes a housing defining an opening therein, a circuit board, and an integrated unit coupled with the circuit board. The integrated unit includes a front camera configured to capture a visible light iris image and an iris recognition camera configured to capture an infrared iris image. The terminal device further includes an infrared fill-light disposed at one side of the circuit board adjacent to the integrated unit. The terminal device further includes a plate adapted to the opening and includes a first light transmitting portion, a second light transmitting portion, and a third light transmitting portion. The first light transmitting portion corresponds to the front camera, the second light transmitting portion corresponds to the iris recognition camera, and the third light transmitting portion corresponds to the infrared fill-light.

The terminal device further comprises a decorative frame. The plate is received in the decorative frame and the housing adhesively surrounds the decorative frame.

The first light transmitting portion, the second light transmitting portion, and the third light transmitting portion is holes and the terminal device further comprises a plurality of cylindrical plugs received in the holes. The holes are stepped holes or circular holes.

At least one of the cylindrical plug received in the second light transmitting portion and the cylindrical plug received in the third light transmitting portion is provided with an ink layer.

Implementations of the present disclosure will be detailed below.

FIG. 1 is a structure diagram of a terminal device 100 according to an implementation of the present disclosure. The terminal device 100 includes an application processor (AP) 110, a touch display screen 120, an iris recognition camera 130, a front camera 140, and a light filling unit 160. The iris recognition camera 130 and the front camera 140 are disposed in an upper portion of the touch display screen 120. The AP 110 is coupled with the touch display screen 120 and a circuit board 206 (illustrated in FIG. 6) through a bus 150. The circuit board 206 is coupled with the iris recognition camera 130 and the front camera 140. During iris detection of a living body, the light emitted from the light filling unit 160 such as an infrared fill-light, reaches an iris to be reflected back to the iris recognition camera 130. The iris recognition camera 130 is configured to capture an infrared iris image of the living body and the front camera 140 is configured to capture a visible light iris image. The iris detection is implemented based on the infrared iris image and the visible light iris image. Of course, the front camera 140 can also be configured as a front camera alone for self-photographing for example.

The touch display screen 120 is configured to detect an operation on the touch display screen 120 carried out by a user, and send an electrical signal corresponding to the operation to AP 110 when the operation is detected. Thus, the AP 110 can perform corresponding processing according to the operation detected.

Figure 2:
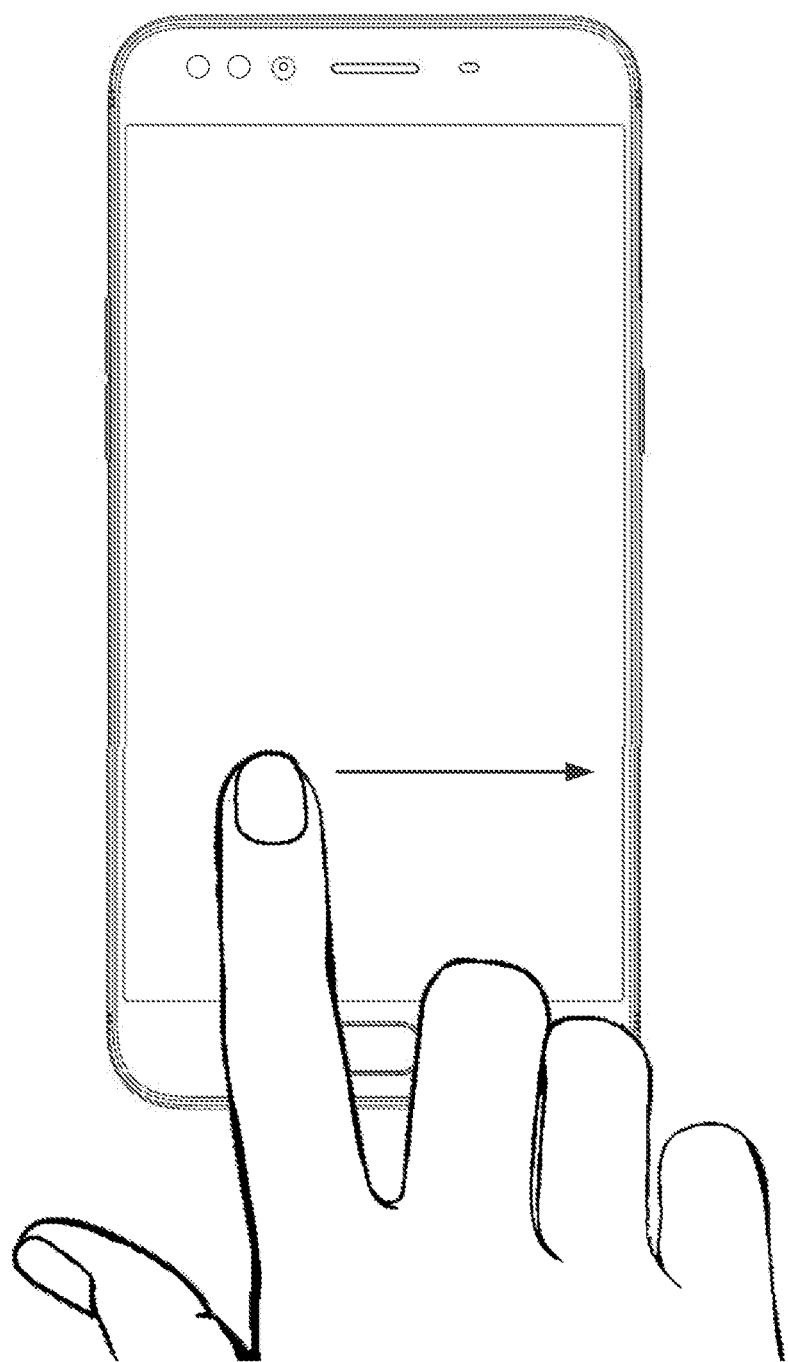
FIG. 2 is a schematic view of an interface of a terminal device according to an implementation of the present disclosure, in which a slide operation on a touch display screen of the terminal device is illustrated.

The above mentioned operation may be a slide operation. During implementation, when the user performs a slide operation on the touch display screen, the terminal device may acquire a sliding track and then turn on the iris recognition camera. FIG. 2 illustrates a touch display screen of the terminal device. A finger can slide on the touch display screen along a direction of an arrow illustrated in FIG. 2. During the slide operation, the terminal device can turn on the iris recognition camera.

The touch display screen may be a thin film transistor-liquid crystal display (TFT-LCD), a light emitting diode (LED) display, an organic light-emitting diode (OLED) display and so on.

Figure 3:
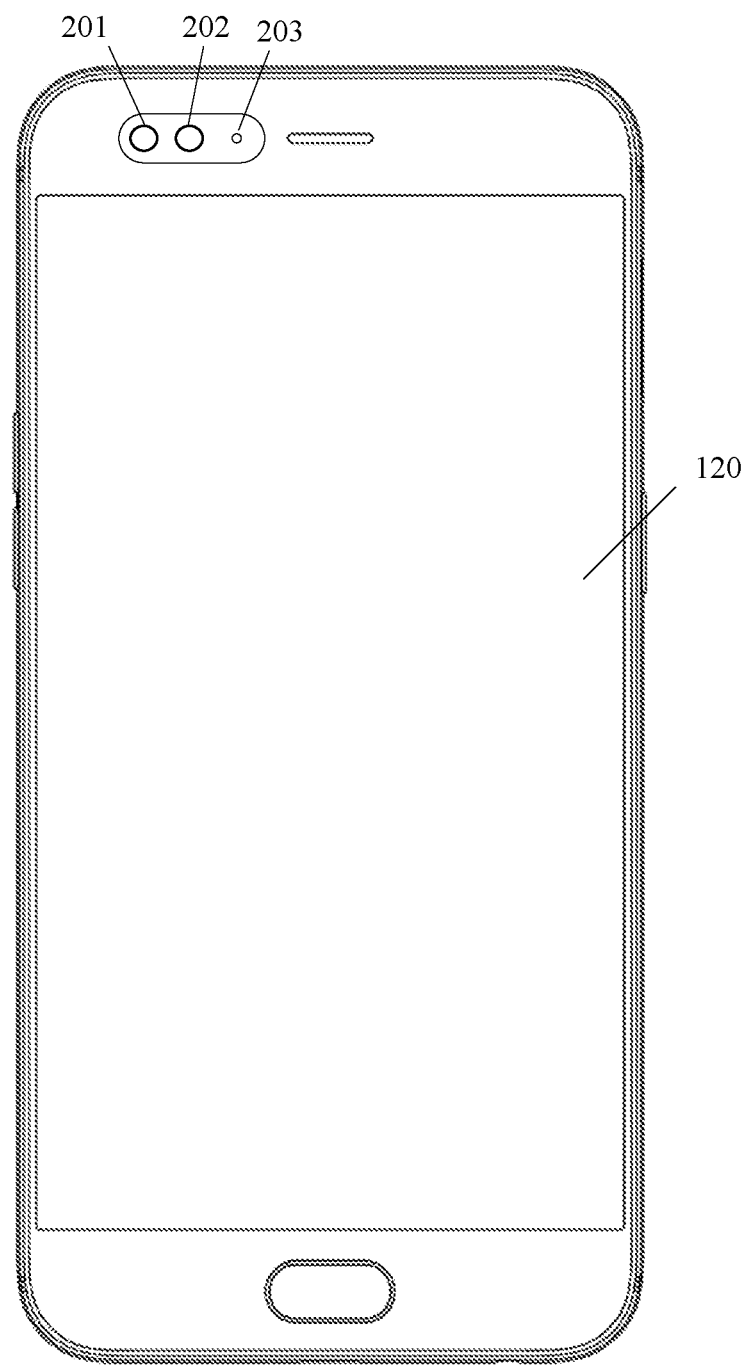
FIG. 3 is another schematic view of a terminal device according to an implementation of the present disclosure.

FIG. 3 is a schematic view of a terminal device according to an implementation of the present disclosure. As illustrated in FIG. 3, the terminal device includes a touch display screen 120 and an apparatus for imaging (such as an iris recognition module) disposed in an upper portion of the touch display screen 120.

Figure 4:
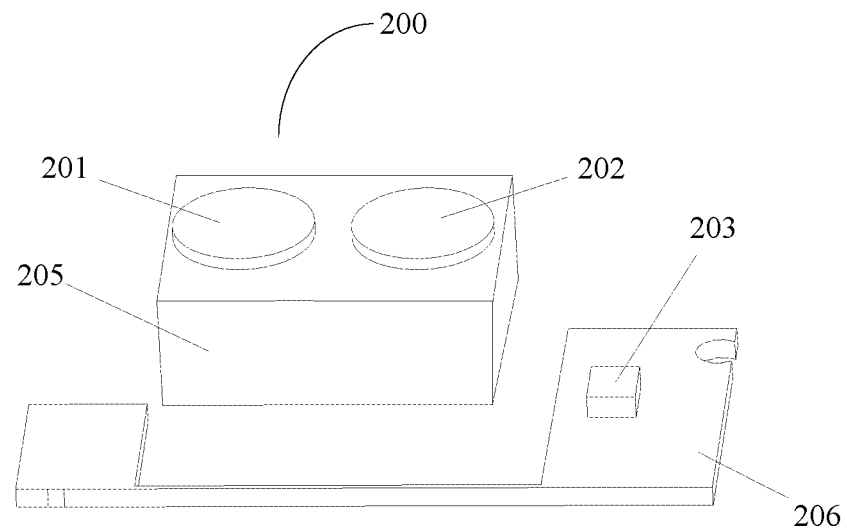
FIG. 4 is a schematic view of an apparatus for imaging according to an implementation of the present disclosure.
Figure 6:
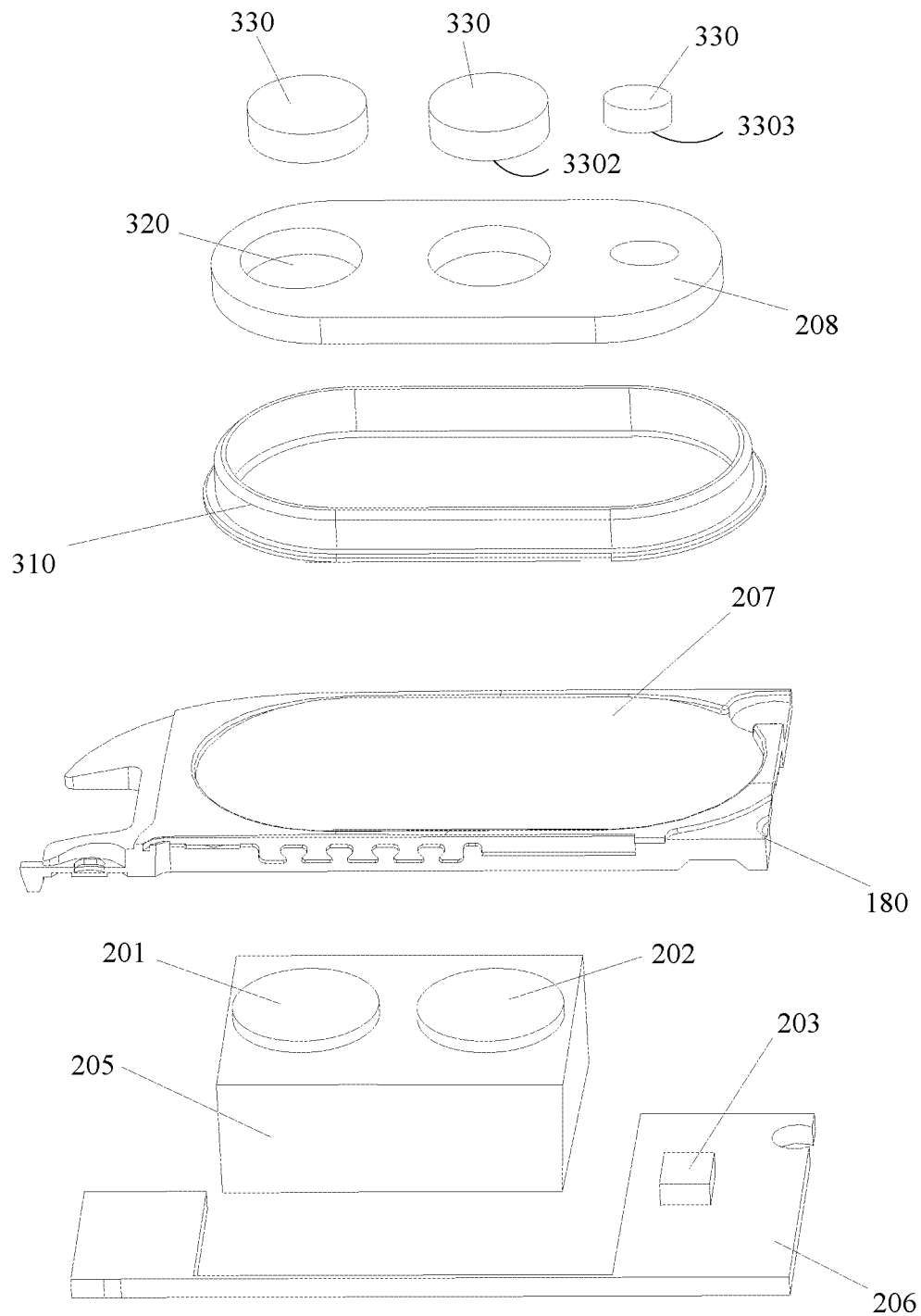
FIG. 6 is an exploded view of a terminal device according to an implementation of the present disclosure.

FIG. 4 is a schematic view illustrating an apparatus for imaging according to implementations of the disclosure. The apparatus for imaging of the terminal device can be the apparatus for imaging 200 illustrated in FIG. 4 for example. The apparatus for imaging 200 includes a front camera 201, an iris recognition camera 202, and an infrared fill-light 203. As illustrated in FIGS. 4 and 6, the front camera 201 and the iris recognition camera 202 are packaged as an integrated unit 205 (also known as an integrated module). The integrated unit 205 is coupled with a circuit board 206. The infrared fill-light 203 is disposed on the circuit board 206 adjacent to one side of the integrated unit 205. For example, the infrared fill-light 203 is adjacent to the iris recognition camera 202 and far away from the front camera 201. That is, a distance from the infrared fill-light 203 to the iris recognition camera 202 is less than a distance from the infrared fill-light 203 to the front camera 201.

Figure 5:
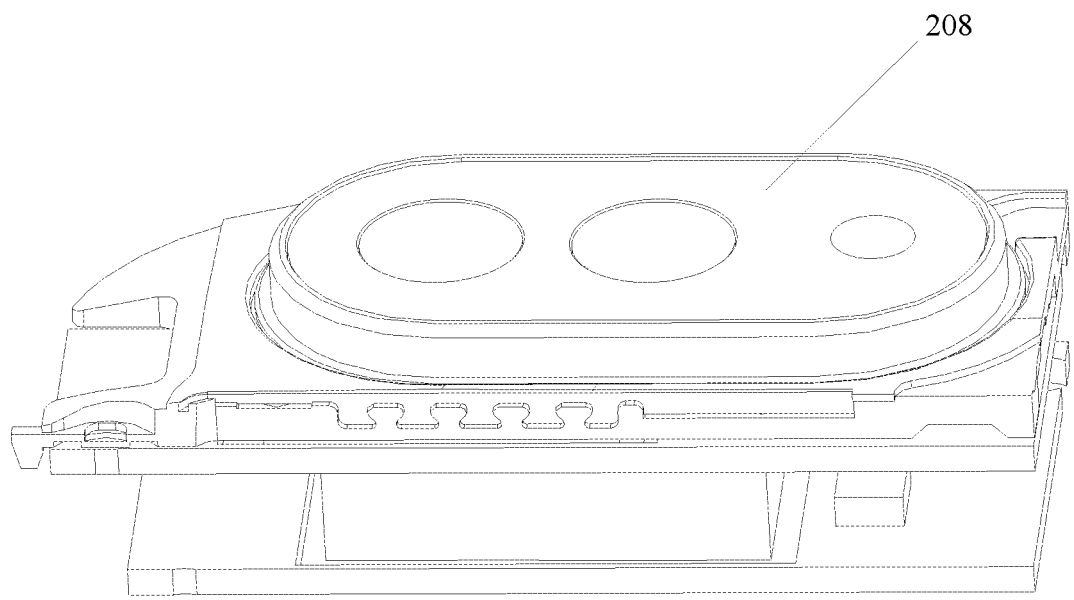
FIG. 5 is a schematic view of a terminal device according to an implementation of the present disclosure.

As illustrated in FIGS. 5 and 6, the terminal device further includes a plate 208. For example, the plate 208 can be a pressing plate. The terminal device has a housing 180, which includes an opening 207 defined therein. The plate 208 adapts to the opening 207. In other words, the plate 208 is matched with the opening 207 in size. The plate 208 includes at least one light transmitting portion corresponding to the cameras and the infrared fill-light respectively. For example, the plate 208 includes a first light transmitting portion 2081, a second light transmitting portion 2082, and a third light transmitting portion 2083. The first light transmitting portion 2081 is disposed opposite to the front camera 201. The second light transmitting portion 2082 is disposed opposite to the iris recognition camera 202. The third light transmitting portion 2083 is disposed opposite to the infrared fill-light 203.

As illustrated in FIGS. 4 to 6, the front camera 201 and the iris recognition camera 202 are packaged into an integrated unit 205 such that the front camera 201 and the iris recognition camera 202 can be arranged close to each other. In this way, the space of the terminal device such as a mobile phone can be saved. In addition, by setting the integrated unit 205, the front camera and the iris recognition camera can achieve the photographic effect of a front dual-camera. The plate can provide an optical zoom space for the cameras, that is, for the front camera and the iris recognition camera, and the plate will not change the mechanical strength of the terminal device. Furthermore, the infrared fill-light 203 is disposed at one side (for example, the right side) of the iris recognition camera 202, which can prevent the infrared fill-light 203 from affecting the front camera.

As illustrated in FIGS. 4 to 6, when the infrared fill-light 203 emits light, the iris recognition camera 202 is filled with the infrared light due to the scattering effect thereof. However, for the front camera 201, the scattered infrared light of the infrared fill-light will affect the photographic effect of the front camera 201. In this disclosure, as the infrared fill-light is disposed at the one side of the iris recognition camera 202, the scattered infrared light will be blocked by the iris recognition camera and therefore, the photographic effect of the front camera will not be affected. As such, after adding the iris recognition function, it has no influence on the original photographic function of the terminal device and can improve the user experience.

Figure 9:
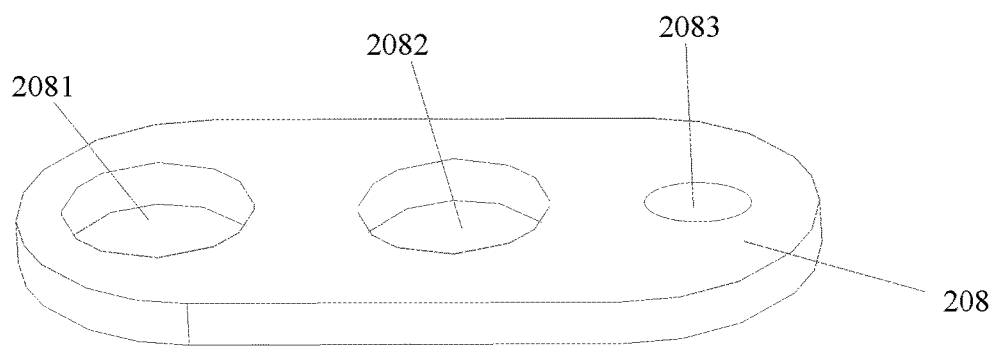
FIG. 9 is a schematic structure view of a plate of the terminal device according to an implementation of the present disclosure.

As illustrated in FIG. 9, the plate 208 may be in a rounded rectangle shape and the opening 207 may also be in a rounded rectangle shape. The configuration of the rounded rectangle allows a front dual-camera of the terminal device and a rear dual-camera of the terminal device to be symmetrical, which improves the aesthetics of the terminal device. In addition, the configuration of the rounded rectangle shape can also facilitate manufacture and effectively improve the yield rate.

Figure 8:
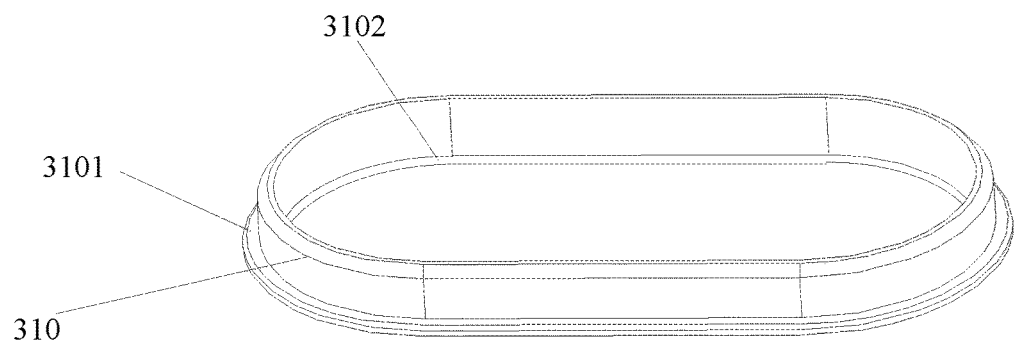
FIG. 8 is a schematic structure view of a decorative ring of the terminal device according to an implementation of the present disclosure.

As illustrated in FIG. 8, a decorative ring 310 is disposed around the plate 208. The decorative ring 310 includes an exterior platform 3101 and an interior platform 3102. The exterior platform 3101 is formed at an exterior side of a bottom of the decorative ring 310. The interior platform 3102 is formed at an interior side of the bottom of the decorative ring 310. The housing 180 is adhesively attached to the exterior platform 3101. The plate 208 is adhesively attached to the interior platform 3102. The decorative ring 310 may have many effects, for example, the decorative ring 310 can improve the appearance and enhance the mechanical strength of the plate 208, besides, the exterior platform 3101 of the decorative ring 310 can attach the decorative ring 310 to the housing 180. Moreover, the interior platform 3102 attached to the plate 208 effectively provides a support to the plate 208 when the terminal device is falling down from a height and a high pressure is applied to the plate 208, which improves the mechanical strength of the plate 208.

The first light transmitting portion 2081, the second light transmitting portion 2082, and the third light transmitting portion 2083 may be through holes or non-through holes. The non-through hole means that the light transmitting portion does not penetrate the plate, in other words, the height of the hole is less than that of the plate. Similarly, the through hole means that the hole penetrates the plate completely. In still another implementation, the second light transmitting portion 2082, and the third light transmitting portion 2083 can be circular holes or stepped holes.

When the above-mentioned light transmitting portions are circular holes or non-through holes 320. The terminal device is also provided with cylindrical plugs 330. Each cylindrical plug corresponds to one transmitting portion. In other words, the cylindrical plugs 330 are adapted to the circular holes or non-through holes 320. The cylindrical plug 330 is adhesively attached to a bottom of the non-through hole. Optionally, the cylindrical plug 330 may be made of wear resistant material.

Figure 7:
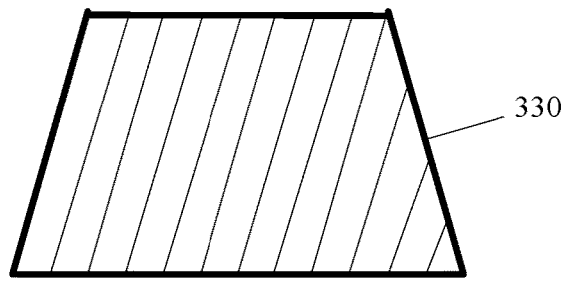
FIG. 7 is a cross section view of a cylindrical plug of an apparatus for imaging according to an implementation of the present disclosure.

FIG. 7 is a cross section view of the cylindrical plug. When the first light transmitting portion 2081, the second light transmitting portion 2082, and the third light transmitting portion 2083 are circular holes, as illustrated in FIG. 7, an upper portion of the cylindrical plug 330 (the upper portion of the cylindrical plug 330 refers to the top of the cylindrical plug 330 which is relatively away from the front camera 201, the iris recognition camera 202, and an infrared fill-light 203, when the cylindrical plug 330 is assembled into the hole 320) has a radial dimension smaller than that of the circular hole, and a lower portion of the cylindrical plug 330 (the lower portion of the cylindrical plug 330 refers to the bottom of the cylindrical plug 330 which is relatively close to the front camera 201, the iris recognition camera 202, and an infrared fill-light 203, when the cylindrical plug 330 is assembled into the hole 320) has a radial dimension larger than the radial dimension of the circular hole, so as to prevent the cylindrical plug 330 from passing through the circular hole. As can be seen, the upper portion of the cylindrical plug 330 has a radial dimension smaller than that of the lower portion of the cylindrical plug 330. If passing through the circular hole, the cylindrical plug 330 will apply a pressure to the front camera 201, the iris recognition camera 202 or the infrared fill-light 203. Thus, the front camera 201, the iris recognition camera 202 or the infrared fill-light 203 may be damaged. Since the radial dimension of the cylindrical plug 330 in the lower portion thereof is larger than the radial dimension of the circular hole, the cylindrical plug can be easily inserted into the circular hole. Besides, since the radial dimension of the cylindrical plug 330 in the upper portion thereof is smaller than the radial dimension of the circular hole, the cylindrical plug can be received in the circular hole with an interference fit, which prevents the cylindrical plug from passing through the circular hole.

The plate 208 has a height larger than that of the housing 180, which can effectively reduce the thickness of the terminal device and allow the plate to be protruded from the housing 180.

The infrared fill-light 203 and the iris recognition camera 202 are arranged along a same horizontal line, that is, the infrared fill-light 203 has the same height as that of the iris recognition camera 202. In addition, the center of the infrared fill-light 203 and the center of the iris recognition camera 202 are located along a same horizontal line.

A distance from the center of the infrared fill-light 203 to the center of the iris recognition camera 202 may range from 20 mm to 45 mm, which can reduce the effect of the infrared fill-light on the front camera 201.

The cylindrical plug 330 corresponding to the third light transmitting portion 2083 is provided with an ink layer 3303 on at least one side thereof. The ink layer 3303 may have a transmittance wavelength ranges from 840 nm to 1000 nm. Since the wavelength of the visible light ranges from 400 nm to 760 nm, the visible light cannot pass through the ink layer. Further, since the wavelength of the infrared light ranges from 760 nm to 1000 nm, the infrared fill-light is invisible to the user.

The cylindrical plug 330 corresponding to the second light transmitting portion 2082 is provided with an ink layer 3302 on at least one side thereof. The ink layer 3302 may have a transmittance wavelength ranges from 810 nm to 1000 nm, therefore, the iris recognition camera 202 is invisible to the user.

With the implementations of the present disclosure, the front camera and the iris recognition camera are packaged into the integrated unit so that the front camera and the iris recognition camera can be arranged close to each other. Thereby, the space of the terminal device can be saved. In addition, by setting the integrated unit, the front camera and the iris recognition camera can act as a front dual-camera. Setting the plate can provide a physical zoom space for the cameras, and the plate will not change the mechanical strength of the terminal device. Furthermore, the infrared fill-light is disposed at the one side of the iris recognition camera, which can avoid influence on the front camera. When the infrared fill-light emits infrared light, the iris recognition camera is filled with the infrared light due to the scattering effect thereof. However, for the front camera, the scattered light will affect the photographic effect of the front camera. In this disclosure, as the infrared fill-light is disposed at the one side of the iris recognition camera, the scattered infrared light will be blocked by the iris recognition camera and therefore, will not affect the photographic effect of the front camera. Addition of the iris recognition function can improve user experience and will not affect the original photographic function of the terminal device.

Figure 10:
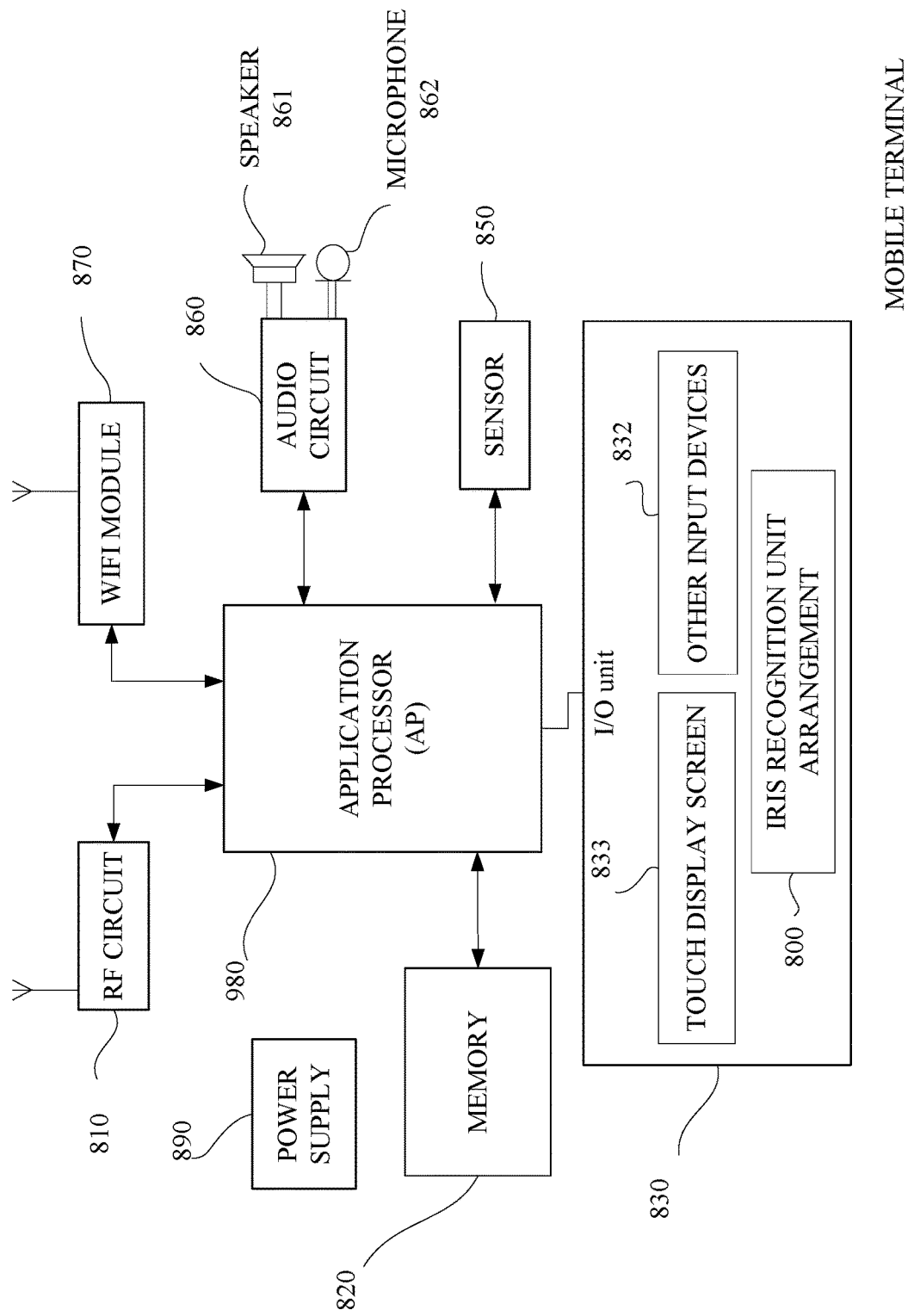
FIG. 10 is a schematic view of another terminal device according to an implementation of the present disclosure.

FIG. 10 is a block diagram illustrating of a part of a structure of a mobile terminal related to the terminal device provided in implementations of the present disclosure. As illustrated in FIG. 10, the mobile terminal includes a radio frequency (RF) circuit 810, a memory 820, an input unit 830, a sensor 850, an audio circuit 860, a Wireless Fidelity (Wi-Fi) module 870, an application processor (AP) 880, and a power supply 890 and other components. Those skilled in the art should understand that, the structure of the mobile terminal illustrated in FIG. 10 does not constitute any limitation to the terminal device of the present disclosure. The structure can include more or fewer components, or some components can be combined, or components can be arranged in a different way.

Each component of the mobile terminal will be specifically introduced below in combination with FIG. 10.

The input unit 830 may be configured to receive input numerical or character information, and generate key signal inputs related to user settings and function control of the mobile terminal. Specifically, the input unit 830 may include a touch display screen 833, an apparatus for imaging such as an iris recognition module 800, and other input devices 832. The iris recognition module 800 is disposed at an upper portion of the touch display screen 833. The input unit 830 may include other input devices 832. Specifically, the other input devices 832 may include, but are not limited to one or more of a physical key, a function key (such as a volume control key, a switch key, and so on), a trackball, a mouse, a joystick, and so on. The touch display screen 833 is configured to turn on an iris recognition camera in the apparatus for imaging for iris recognition when a slide operation on the touch display screen 833 is detected, and send a set of iris parameters (in the following, "iris parameter set" for short) to the AP 880. The AP 880 is configured to verify each parameter in the iris parameter set, and to perform a corresponding operation (such as unlock operation) in response to iris parameters set passing the verification.

The AP 880 is a control center for the mobile terminal, it uses various interfaces and lines to connect various components of the mobile terminal. The AP 880 is configured to perform various functions and process data of the mobile terminal by running or executing software programs and/or modules stored in the memory 820, and invoke data stored in the memory 820, thereby achieve overall monitoring of the mobile terminal. Alternatively, the AP 880 may include one or more processing units. As one implementation, the AP 880 may be integrated with an application processor and a modem processor. The application processor is mainly configured to deal with the operating system, user interface, application programs, and so on. The modem processor is mainly configured to deal with wireless communication. It should be noted that, the above-identified modem processor may also not be integrated into the AP 880.

In addition, the memory 820 may include a high-speed random access memory, and may further include a non-transitory storage device, such as at least one of a magnetic disk storage device, a flash memory device, or other transitory solid-state storage devices.

The RF circuit 810 may be configured for information transmission and information reception. In general, the RF circuit 810 includes, but not limited to, an antenna, at least one amplifier, a transceiver, a coupler, a low noise amplifier (LNA), a duplexer, and so on. In addition, the RF circuit 810 may also communicate with a network and other devices via wireless communication. The above wireless communication may support any communication standard or protocol, which includes, but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and so on.

The mobile terminal may further include at least one sensor 850, such as a light sensor, a motion sensor, and other sensors. Specifically, the light sensor may include an ambient light sensor and a proximity sensor. The ambient light sensor may be configured to adjust the luminance of the touch display screen according to the luminance of ambient light. The proximity sensor may be configured to turn off the touch display screen and/or backlight when the mobile terminal is approaching the ear. As a kind of motion sensor, the accelerometer sensor can be configured to detect the acceleration in all directions (usually three axes), and can be configured to detect the magnitude and direction of gravity at rest. The accelerometer sensor can be configured to identify the gesture of the mobile terminal (such as horizontal and vertical screen switching, related Games, magnetometer attitude calibration), vibration identification related functions (such as a pedometer, percussion), and so on. The mobile terminal can also be provided with other sensors, such as gyroscopes, barometers, hygrometers, thermometers, infrared sensors, and so on, and details are not described herein again.

The mobile terminal may further include a speaker 861 and microphone 862 receptively connected to the audio circuit 860. The audio circuit 860, the speaker 861, and microphone 862 provide audio interfaces between the user and the mobile terminal. The audio circuit 860 may be configured to convert received audio data into an electrical signal, and transmit the electrical signal to the speaker 861, and then the electrical signal is converted into a sound signal for playing by the speaker 861. On the other hand, the microphone 862 is configured to convert collected sound signal into an electrical signal, which is received by the audio circuit 860 and then converted into an audio signal. The audio signal is played and processed by the AP 880, and then is sent to another mobile terminal via the RF circuit 810, for example. Or, the audio data is stored in the memory 820 for subsequent processing.

Wi-Fi is a short-range wireless transmission technology. With the Wi-Fi module 870, the mobile terminal can help users send and receive e-mail, browse the web, access streaming media, and so on, which provides the user with wireless broadband Internet access. Although the Wi-Fi module 870 is illustrated in FIG. 10, however, it should be understood that, the Wi-Fi module 870 is not a necessary component of the mobile terminal, and can be omitted as needed without changing the essence of the disclosure.

The mobile terminal further includes a power supply 890 (such as a battery) for powering various components. Preferably, the power supply can be logically connected to the AP 880 via a power management system, to manage charging, discharging, power management functions, and so on, through the power management system.

Although not illustrated, the mobile terminal may further include a camera, a Bluetooth module, and the like.

It should be noted that, for the foregoing method implementations, for a brief description, all of the method implementations are described as a series of operation combinations. However, those skilled in the art should understand that the present disclosure is not limited by the described sequence of operations, as certain steps may be performed in other sequences or concurrently according to the present disclosure. In addition, those skilled in the art should also know that the implementations described in the specification are exemplary implementations, and the actions and modules involved are not necessarily required by the present disclosure.

In the foregoing implementations, descriptions of each implementation are emphasized respectively, and parts which are not elaborated in a certain implementation may subject to relevant descriptions of other implementations.

In the implementations provided in the present disclosure, it should be understood that, the device disclosed may be implemented in other ways. For example, the device implementations described above are merely illustrative, for instance, the division of units is only a logical function division and there can be other ways of the division during actual implementations. For example, multiple units or components may be combined or integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components illustrated as units may or may not be physical units, namely, they may be in the same place or may be distributed to multiple network units. Part or all of the units may be selected per actual needs to achieve the purpose of the technical solutions of the implementations.

In addition, the functional units in various implementations of the present disclosure may be integrated in one processing unit, or each unit may be physically present, or two or more units may be integrated in one unit. The above-mentioned integrated unit may be implemented in the form of hardware, or in the form of hardware plus software function unit.

The integrated units may be stored in a computer-readable storage medium, if the integrated units are implemented in the form of software functional modules and sold or used as an independent product. Based on such understanding, the technical solution of the present disclosure essentially, or the part contributing to the prior art, or all or a part of the technical solution may be implemented in the form of a software product. The computer software product is stored in a storage medium, and includes several instructions for causing a computer device (which may be a personal computer, a server, a network device and so on) to execute some or all of the steps of the method according to each implementation of the present disclosure. The foregoing storage medium includes various media capable of storing program codes, such as a USB disk, a read-only memory (ROM), a random access memory (RAM), a removable hard disk, a magnetic disk, or an optical disk and so on.

Those skilled in the art should understand that all or part of the steps of the various methods in the foregoing implementations may be implemented by a program instructing relevant hardware. The program may be stored in a computer-readable memory, and the memory may include a flash disk, a ROM, a RAM, a magnetic disk, or an optical disk and so on.

The implementations of the present disclosure are described in detail above. Specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A terminal device, comprising a circuit board and an iris recognition module, the iris recognition module comprising;
   a front camera, configured to capture a visible light iris image during iris detection;
   an iris recognition camera, configured to capture an infrared iris image during the iris detection;
   an infrared fill-light, configured to emit infrared light during the iris detection;
   a plate adapted to an opening defined in a housing of the terminal device; the plate comprising a first light transmitting portion, a second light transmitting portion, and a third light transmitting portion, the first light transmitting portion being disposed opposite to the front camera, the second light transmitting portion being disposed opposite to the iris recognition camera, and the third light transmitting portion being disposed opposite to the infrared fill-light; and
   a plurality of cylindrical plugs, wherein
       the front camera and the iris recognition camera are packaged into an integrated unit coupled with the circuit board,
       the infrared fill-light is disposed at one side of the circuit board adjacent to the integrated unit, and
       the first light transmitting portion, the second light transmitting portion, and the third light transmitting portion are non-through holes, and each cylindrical plug is adhesively attached to a bottom of the non-through hole.

2. The terminal device of claim 1, wherein the plate is in a rounded rectangle shape.

3. The terminal device of claim 1, wherein at least one of the plurality of cylindrical plugs is made of wear resistant material.

4. The terminal device of claim 1, wherein at least one of the plurality of cylindrical plugs corresponding to the third light transmitting portion is provided with an ink layer on at least one side of the at least one of the plurality of cylindrical plugs.

5. The terminal device of claim 1, wherein at least one of the plurality of cylindrical plugs corresponding to the second light transmitting portion is provided with an ink layer on at least one side of the at least one of the plurality of cylindrical plugs.

6. The terminal device of claim 1, further comprising a decorative ring disposed around the plate.

7. The terminal device of claim 6, wherein the decorative ring comprises an exterior platform disposed at an exterior side of a bottom of the decorative ring, and the exterior platform is adhesively attached to the housing.

8. The terminal device of claim 6, wherein the decorative ring comprises an interior platform disposed at an interior side of a bottom of the decorative ring, and the interior platform is adhesively attached to the plate.

9. The terminal device of claim 1, wherein the plate has a height greater than a height of the housing.

10. A terminal device, comprising:
    a housing defining an opening therein;
    a circuit board;
    an integrated unit coupled with the circuit board, comprising:
        a front camera, configured to capture a visible light iris image;
        an iris recognition camera, configured to capture an infrared iris image;
        an infrared fill-light, disposed at one side of the circuit board adjacent to the integrated unit;
    a plate, being adapted to the opening and comprising a first light transmitting portion;
    a second light transmitting portion; and
    a third light transmitting portion, wherein the first light transmitting portion corresponds to the front camera, the second light transmitting portion corresponds to the iris recognition camera, and the third light transmitting portion corresponds to the infrared fill-light; and
    a decorative frame, wherein the plate is received in the decorative frame and the housing adhesively surrounds the decorative frame.

11. The terminal device of claim 10, wherein the first light transmitting portion, the second light transmitting portion, and the third light transmitting portion are holes, and the terminal device further comprises a plurality of cylindrical plugs received in the holes.

12. The terminal device of 18, wherein the holes are stepped holes or circular holes.

13. The terminal device of claim 11, wherein at least one of the plurality of cylindrical plugs received in the second light transmitting portion and at least one of the plurality of the cylindrical plugs received in the third light transmitting portion is provided with an ink layer.

14. A terminal device, comprising a circuit board and an iris recognition module, the iris recognition module comprising;
    a front camera, configured to capture a visible light iris image during iris detection;
    an iris recognition camera, configured to capture an infrared iris image during the iris detection;
    an infrared fill-light, configured to emit infrared light during the iris detection;
    a plate adapted to an opening defined in a housing of the terminal device; the plate comprising a first light transmitting portion, a second light transmitting portion, and a third light transmitting portion, the first light transmitting portion being disposed opposite to the front camera, the second light transmitting portion being disposed opposite to the iris recognition camera, and the third light transmitting portion being disposed opposite to the infrared fill-light; and
    a plurality of cylindrical plugs,
    wherein the front camera and the iris recognition camera being packaged into an integrated unit coupled with the circuit board, the infrared fill-light being disposed at one side of the circuit board adjacent to the integrated unit, and
    wherein the first light transmitting portion, the second light transmitting portion, and the third light transmitting portion are circular holes, one end of the cylindrical plug has a radial dimension smaller than that of the circular hole, and the other end of the cylindrical plug has a radial dimension larger than that of the circular hole.

15. The terminal device of claim 14, wherein the terminal device further comprises a decorative ring, the decorative ring being disposed around the plate.

16. The terminal device of claim 15, wherein the decorative ring comprises an exterior platform disposed at an exterior side of a bottom of the decorative ring, the exterior platform is adhesively attached to the housing.

17. The terminal device of claim 15, wherein the decorative ring comprises an interior platform disposed at an interior side of a bottom of the decorative ring, the interior platform is adhesively attached to the plate.

\* \* \* \* \*